(12) United States Patent
Petersen et al.

(10) Patent No.: US 12,117,216 B2
(45) Date of Patent: Oct. 15, 2024

(54) EXPANSION VALVE

(71) Applicant: Danfoss A/S, Nordborg (DK)

(72) Inventors: Hans Kurt Petersen, Nordborg (DK);
Leo Finn Jensen, Nordborg (DK);
Anders Pedersen, Nordborg (DK);
Detlet Matzen, Nordborg (DK);
Alexandra Papadimitriou, Nordborg (DK)

(73) Assignee: DANFOSS A/S, Nordborg (DK)

( * ) Notice: Subject to any disclaimer, the term of this patent is extended or adjusted under 35 U.S.C. 154(b) by 240 days.

(21) Appl. No.: 17/785,200

(22) PCT Filed: Dec. 15, 2020

(86) PCT No.: PCT/EP2020/086313
§ 371 (c)(1),
(2) Date: Jun. 14, 2022

(87) PCT Pub. No.: WO2021/122664
PCT Pub. Date: Jun. 24, 2021

(65) Prior Publication Data
US 2023/0011997 A1  Jan. 12, 2023

(30) Foreign Application Priority Data

Dec. 20, 2019  (DK) .................................. 201901526

(51) Int. Cl.
*F25B 41/35*    (2021.01)
*F16K 1/02*     (2006.01)
(Continued)

(52) U.S. Cl.
CPC ................ *F25B 41/35* (2021.01); *F16K 1/02* (2013.01); *F16K 1/04* (2013.01); *F16K 1/12* (2013.01); *F25B 2341/06* (2013.01); *Y02B 30/70* (2013.01)

(58) Field of Classification Search
CPC ...... F25B 41/35; F25B 2341/06; Y02B 30/70; F16K 1/02; F16K 1/04; F16K 1/12
(Continued)

(56) References Cited

U.S. PATENT DOCUMENTS 4,275,764 A * 6/1981 Baret ................. G05D 16/0655
251/246
6,460,567 B1 * 10/2002 Hansen, III ............. F16K 31/04
137/625.48
(Continued)

FOREIGN PATENT DOCUMENTS

CN   102853598 A   1/2013
CN   109073294 A   12/2018
(Continued)

OTHER PUBLICATIONS

First Examination Report corresponding to Indian Patent Application No. 202217033743, dated Nov. 15, 2022.
(Continued)

*Primary Examiner* — William M McCalister
(74) *Attorney, Agent, or Firm* — McCormick, Paulding & Huber PLLC

(57) ABSTRACT

An expansion valve (1) is described to include a housing (2) having in inlet port (3) and an outlet port (4), a valve seat (5) arranged between the inlet port (3) and the outlet port (4), a valve element (6) movable over an operating stroke between a closed position at the valve seat (5) and an opened position away from the valve seat (5), and an actuator (7), wherein the actuator (7) has an electric rotary motor (8) acting on the valve element (5) by means of a threaded spindle (10) and a nut (9), wherein one of spindle (10) and nut (9) is rotatably driven by the motor (8) and the other one is rotatably fixed. Such an expansion valve should have the possibility for a simple assembly. To this end, in a disassembled condition of housing (2) and actuator (7), the actuator (7) has a mounting (Continued)

stroke which is at least two times the operating stroke, wherein the mounting stoke extends the operating stroke.

13 Claims, 2 Drawing Sheets

(51) Int. Cl.
  *F16K 1/04* (2006.01)
  *F16K 1/12* (2006.01)
(58) Field of Classification Search
  USPC .................................................. 251/129.11
  See application file for complete search history.

(56) References Cited

U.S. PATENT DOCUMENTS

| | | | |
|---|---|---|---|
| 8,978,398 B2 | 3/2015 | Faulkner et al. | |
| 10,352,475 B2* | 7/2019 | Uehara | F16K 37/0041 |
| 11,761,557 B2* | 9/2023 | Huang | F16K 27/0254 |
| | | | 251/129.04 |
| 2003/0089871 A1* | 5/2003 | Hashimoto | F16K 31/047 |
| | | | 251/129.11 |
| 2009/0294713 A1* | 12/2009 | Harada | F25B 41/35 |
| | | | 251/129.15 |
| 2010/0187462 A1* | 7/2010 | Davies, Jr. | F16K 47/02 |
| | | | 251/318 |
| 2012/0247129 A1 | 10/2012 | Faulkner et al. | |
| 2014/0103240 A1* | 4/2014 | Glime, III | F16K 1/04 |
| | | | 251/272 |
| 2015/0316168 A1 | 11/2015 | Lv | |
| 2017/0175726 A1 | 6/2017 | Kume et al. | |
| 2019/0086456 A1* | 3/2019 | Mellinger | F16K 1/12 |

FOREIGN PATENT DOCUMENTS

| | | |
|---|---|---|
| EP | 3 056 778 A1 | 8/2016 |
| EP | 3 550 193 A1 | 10/2019 |
| JP | 2001-091110 A | 4/2001 |
| WO | 2018/104391 A1 | 6/2018 |

OTHER PUBLICATIONS

International Search Report mailed on Apr. 8, 2021, in connection with corresponding International Application No. PCT/EP2020/086313; 3 pages.

* cited by examiner

EXPANSION VALVE

CROSS-REFERENCE TO RELATED APPLICATION

This application is a National Stage application of International Patent Application No. PCT/EP2020/086313, filed on Dec. 15, 2020, which claims priority to Danish Application PA201901526, filed Dec. 20, 2019, each of which is hereby incorporated by reference in its entirety.

TECHNICAL FIELD

The present invention relates to an expansion valve comprising a housing having an inlet port and an outlet port, a valve seat arranged between the inlet port and the outlet port, a valve element moveable over an operating stroke between a fully open position away from the valve seat and a closed position at the valve seat, and an actuator, wherein the actuator comprises an electric rotary motor acting on the valve element.

BACKGROUND

Such an expansion valve is used in a refrigerant circuit to expand refrigerant under controlled conditions. When the expansion valve is used in connection with high pressure refrigerant, e.g. carbon dioxide, tolerances must be kept small to avoid leakages. This makes assembly of such an expansion valve complicated and difficult.

SUMMARY

The object underlying the invention is to have the possibility for a simple assembly of an expansion valve.

This object is solved with an expansion valve with an expansion valve as described at the outset in that in a disassembled condition of housing and actuator the acuator has a mounting stroke which is at least two times the operating stroke, wherein the mounting stoke extends the operating stroke.

Having such a construction, it is possible to move an actuation element which is to be connected with the valve element quite far out of the housing before the elements of the expansion valve are assembled. When the actuation element to be connected with the valve element is moved far enough out of the housing, more space is available for the assembly of the parts, so that the assembly can be made with a higher precision. Thereafter the actuation element can be retracted. When the expansion valve is completely assembled, the additional stroke of the actuator is no longer necessary. Once the expansion valve is assembled, the actuator has to perform the operating stroke only.

In an embodiment of the invention the valve element is in form of a slider and comprises a connection to an actuation element of the actuator in which connection the slider is put laterally into the actuator. When the parts slider and actuation element are put together laterally, this is a simple way of connecting the two parts. Such a connection is possible when the actuation element has been moved out of the housing far enough.

In an embodiment of the invention the connection is covered by a housing part over the operating stroke. This means that during the operation of the expansion valve the connection between the slider and the actuation element is always covered by the housing part. The housing part can be, for example, a tube-like element of the housing.

In an embodiment of the invention at least during a closing movement of the valve element, the connection is flexible and allows a tilting of the valve element in relation to the actuation element. When the slider is allowed to tilt, it is possible to achieve reliably a complete closure of the expansion valve. The slider can rest with the complete front face against the valve seat, so that the risk of leakages is reduced to a minimum. Nevertheless, it is not necessary to use very high tolerances during production and during mounting of the respective parts.

In an embodiment of the invention the valve element rests against the actuation element with a point-like contact area. The point-like contact area allows tilting of the valve element in relation to the actuation element.

In an embodiment of the invention the point-like contact area is formed on top of a spherical protrusion on the valve element and/or the actuation element. This is a simple way to realize the point-like contact area.

In an embodiment of the invention a pressure at the inlet port acts on a first pressure area of the valve element in closing direction and on a second pressure area of the valve element in an opening direction, wherein the first pressure area is larger than the second pressure area. The pressure at the inlet port is used to produce a net force on the valve element pressing the valve element against the valve seat. Thus, in a closed condition the expansion valve can be kept tight without the necessity that the actuator is permanently actuated with a high closing force.

In an embodiment of the invention at least a part of the second pressure area is formed in a region starting at an end of the valve element at the valve seat. The region can have, for example, a conical form. The pressure at the inlet port surrounds this second pressure area and produces a force in opening direction.

In an embodiment of the invention the end of the valve element at the valve seat has a thickness smaller than a thickness at the end of the region remote from the valve seat. This means that the area with which the valve element rests against the valve seat can be kept small, so that forces pressing the valve element against the valve seat produce a quite large contact pressure which is positive for the tightness of the valve.

In an embodiment of the invention the end of the valve element at the valve seat forms a sharp edge. The sharper the edge is, the higher is the contact pressure.

In an embodiment of the invention the valve element is made of a metal and the valve seat comprises a surface made of a plastic material. The plastic material can be, for example, PEEK (Polyetheretherketone). In a preferred embodiment the plastic material is fibre reinforced.

BRIEF DESCRIPTION OF THE DRAWINGS

An embodiment of the invention will now be described in more detail with reference to the drawing, wherein.

In all figures the same elements are denoted with the same reference numerals. The drawings are not on scale.

DETAILED DESCRIPTION

Figure 1:
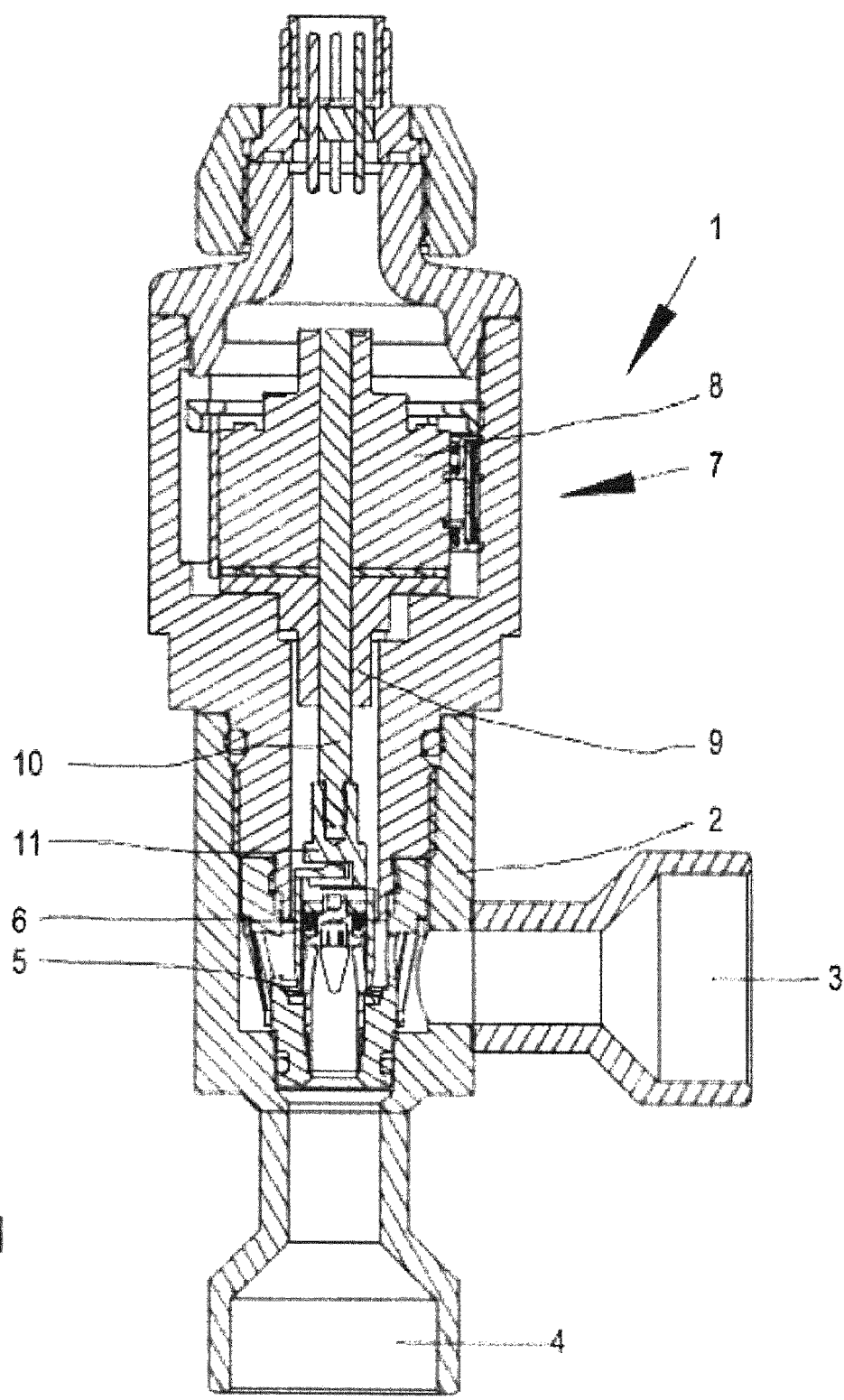
FIG. 1 shows a sectional view of an expansion valve.

FIG. 1 shows schematically an expansion valve 1 comprising a housing 2. The housing comprises an inlet port 3 and an outlet port 4. A valve seat 5 is arranged between the inlet port 3 and the outlet port 4. A valve element 6 in form of a slider is moveable from a closed position shown in FIGS. 1 and 2 to a fully open position (not shown). The distance between the closed position and the fully open position is abbreviated with "operation stroke".

Movement of the valve element 6 is caused by an actuator 7 in form of an electric rotary motor 8 which can be, for example, in form of a stepper motor. The motor 8 can be, for example, connected to a nut 9. The nut 9 is screwed on a threaded spindle 10. When the motor 8 is operated, it drives the nut 9 which is a rotating element of a drive acting on the valve element 6, whereas the spindle 10 is held unrotatably. Thus, rotation of the nut 9 is translated into a linear movement of the spindle 10.

An actuation element 11 is fixed to the end of the spindle 10 close to the valve seat 5. The actuating element 11 comprises a slot-like opening 12 which is open to a radial side 13. In other words, the slot-like opening 12 extends perpendicular to an axis of rotation of the nut 9. Thus, the valve element 6 can be put laterally into the actuating element 11. To this end, the valve element 6 comprises a plate 14 at an end adjacent to the actuating element 11. The plate 14 is adapted to the slot-like opening 12.

The plate 14 bears a spherical protrusion 15 which rests against an upper wall 16 of the slot-like opening 12 when the actuation element 11 is moved towards the valve seat 5. The spherical protrusion 15 forms a point-like contact area with the wall 16 of the slot-like opening 12. Thus, the valve element 6 which is in form of a slider of hollow cylindrical form can slightly tilt with respect to the axis of rotation of the nut 9.

Figure 2:
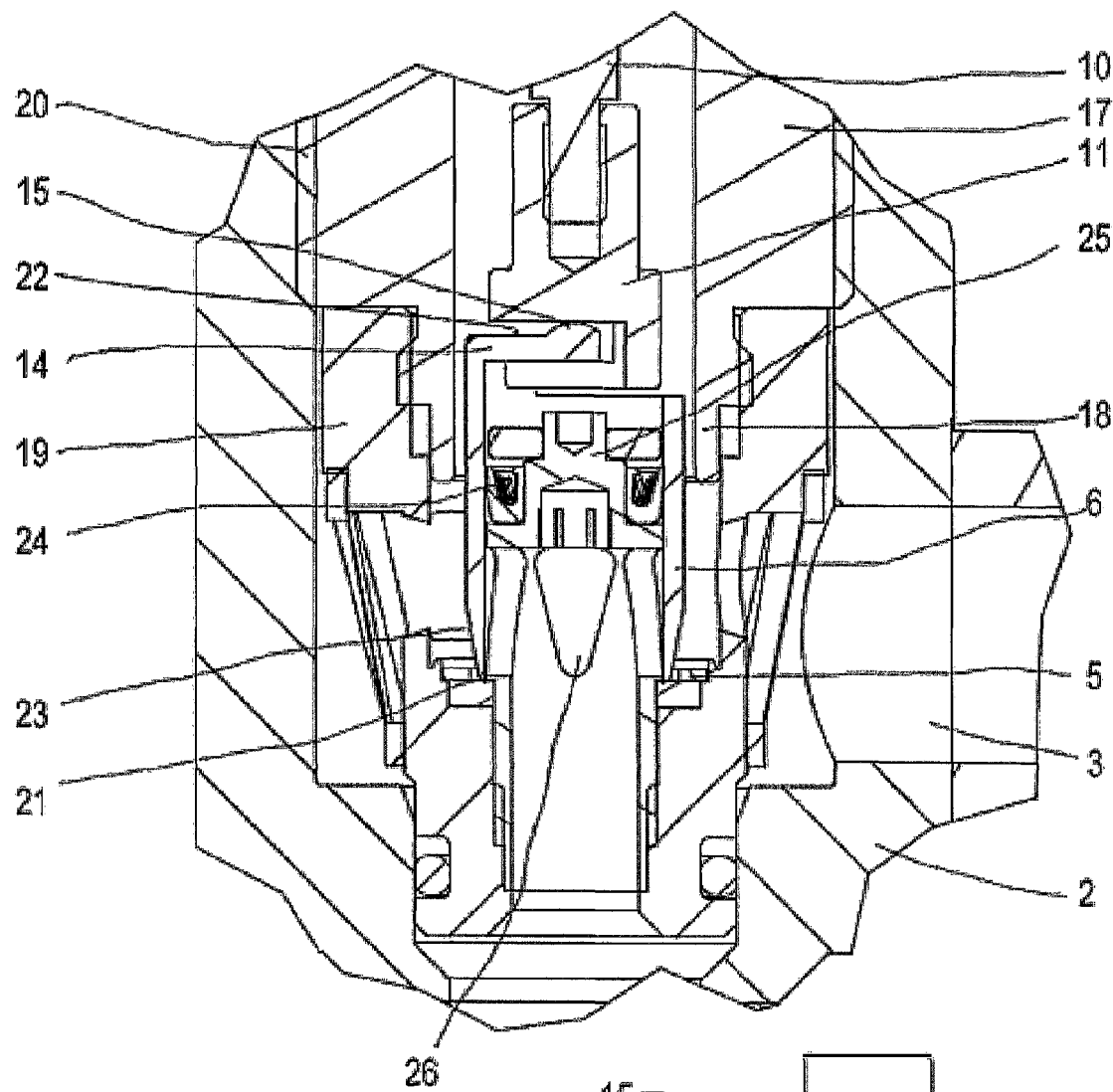
FIG. 2 shows an enlarged view of a detail of FIG. 1.
Figure 3:
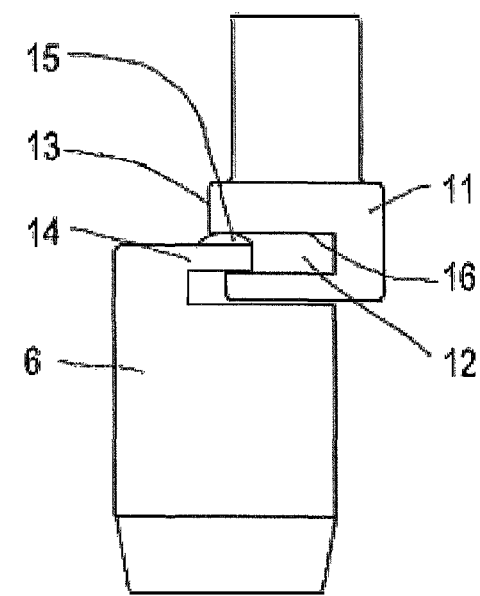
FIG. 3 shows a connection between a valve element and an actuating element.

The motor 8, the nut 9, the spindle 10 and the actuation element 11 are mounted in an actuator housing 17 when the expansion valve 1 is completely assembled. The actuator housing 17 comprises a tube-like part 18. The tube-like part 18 covers the connection between actuation element 11 and the valve element 6, as can be seen in FIG. 2. Thus, the connection between the valve element 6 and the actuation element 11 cannot be disengaged in the assembled condition of the expansion valve 1.

However, in order to establish the connection between the valve element 6 and the actuation element 11 the spindle 10 can be moved beyond the position in which the valve element 6 would contact the valve seat when the expansion valve 1 is assembled. i.e. it can be moved over a mounting stroke of the actuator 7 which is larger than the operating stroke and extends the operating stroke. The mounting stroke is at least two times the operating stroke, preferably at least three times the operating strok. Thus, before mounting the actuator housing 17 to the housing 2 or to an insert 19 which will be explained later, the actuator 7 moves the actuation element 11 out of the tube 18. To this end, the nut 9 has a distance to the end of the spindle 10 remote from the valve seat 5 which is at least twice the operating stroke.

In an embodiment not shown it is possible to drive the spindle 10 rotatably and to fix the nut 9 against rotation. In this case the relations are vice versa. The nut is mounted on the spindle 10 in a position having a distance to the end of the spindle 10 near the valve seat 5 which is at least twice the operation stroke.

In an embodiment the operation stroke of the expansion valve 1 is 5 mm i.e. the valve element 6 can be lifted off the valve seat over a stroke of 5 mm.

In the unassembled state the actuator 7 can move the actuation element 11 from the position shown in FIGS. 1 and 2 over at least 10 mm, i.e. the mounting stroke is 15 mm.

When the actuation element has been moved out of the tube 18, there is no problem to mount the valve element 6 to the actuation element 11 just by putting it into the actuation element 11 laterally.

The insert 19 mentioned above is screwed onto the tube 18 once the valve element 6 has been connected to the actuation element 11. The actuator housing 17 and the insert 19 together are then shifted into the housing 2 and the actuator housing 17 is connected to the housing 2 by means of a threaded connection 20. However, the insert is considered to be part of the housing 2.

The valve element 6 is in form of a slider and basically in form of a hollow cylinder. The valve element 6 comprises a sharp edge 21 at the face contacting the valve seat 5. The valve element 6 comprises a first pressure area 22 which is loaded by a pressure at the inlet 3. Furthermore, the valve element 6 comprises a second pressure area 23 which is likewise loaded by the pressure at the inlet 3 The first pressure area 22 is slightly larger than the second pressure area 23. Thus, the pressure at the inlet 3 produces a net force onto the valve element 6 which acts on the valve element 6 in a direction towards the valve seat 5. Thus, even when the actuator 7 is not energized and the valve element 6 is in the closed condition shown in FIGS. 1 and 2 the expansion valve 1 will remain closed.

The point-like contact realized by the spherical protrusion 15 allows a tilting of the valve element to a certain degree. Thus, the valve element 6 can always contact the valve seat 5 over the whole circumference.

A sealing arrangement 24 is arranged inside the valve element 6 and prevents refrigerant from passing the valve element 6. The sealing arrangement 24 is arranged on a protrusion 25. The protrusion 25 is part of the insert 19. The protrusion 25 comprises a number of openings 26 which are distributed evenly in circumferential direction. Thus, when the valve element 6 is lifted off the valve seat 5, refrigerant can flow through the gap between the valve element 6 and the valve seat 5 and through the openings 26 to the outlet port 4.

The valve element 6 can be made from a metallic material, for example steel. The valve seat 5 is at least at the surface contacting the valve element 6 made of a plastic material, in particular of a polymer, like PEEK (Polyetheretherketone). Preferably the plastic material is fibre reinforced.

The sharp edge 21 of the valve element 6 is slightly pressed into the valve seat 5, however, without damaging it. In this way the tightness of the expansion valve 1 in closed condition can be maintained over a rather long time of operation.

While the present disclosure has been illustrated and described with respect to a particular embodiment thereof, it should be appreciated by those of ordinary skill in the art that various modifications to this disclosure may be made without departing from the spirit and scope of the present disclosure.

The invention claimed is:

1. An expansion valve comprising a housing having an inlet port and an outlet port, a valve seat arranged between the inlet port and the outlet port, a valve element movable over an operating stroke between a fully open position away from the valve seat and a first position, which is a closed position at the valve seat, and an actuator connected to the housing, wherein the actuator comprises an electric rotary motor acting on the valve element, wherein in a disassembled condition of the housing and the actuator, the actuator has a mounting stroke between the fully open position away from the valve seat and a second position, which is a position beyond the first position, such that the mounting stroke extends the operating stroke, and wherein the mounting stroke is at least two times the operating stroke.

2. The expansion valve according to claim 1, wherein the valve element is in form of a slider and comprises a connection to an actuation element of the actuator in which connection the slider is put laterally into the actuator.

3. The expansion valve according to claim 2, wherein the connection is covered by a housing part over the operation stroke.

4. The expansion valve according to claim 2, wherein at least during a closing movement of the valve element the connection is flexible and allows a tilting of the valve element in relation to the actuation element.

5. The expansion valve according to claim 4, wherein the valve element rests against the actuation element with a point like contact area.

6. The expansion valve according to claim 5, wherein the point-like contact area is formed on top of a spherical protrusion on the valve element and/or the actuation element.

7. The expansion valve according to claim 2, wherein a pressure at the inlet port acts on a first pressure area of the valve element in closing direction and on a second pressure area of the valve element in an opening direction, wherein the first pressure area is larger than the second pressure area.

8. The expansion valve according to claim 7, wherein at least a part of the second pressure area is formed in a region starting at an end of the valve element at the valve seat.

9. The expansion valve according to claim 8, wherein the end of the valve element at the valve seat has a thickness smaller than a thickness at the end of the region remote from the valve seat.

10. The expansion valve according to claim 9, wherein the end of the valve element at the valve seat forms a sharp edge.

11. The expansion valve according to claim 2, wherein the valve element is made of metal and the valve seat comprises a surface made of a plastic material.

12. An expansion valve comprising a housing having an inlet port and an outlet port, a valve seat arranged between the inlet port and the outlet port, a valve element movable over an operating stroke between a fully open position away from the valve seat and a first position, which is a closed position at the valve seat, and an actuator connected to the housing, wherein the actuator comprises an electric rotary motor acting on the valve element, wherein in a disassembled condition of the housing and the actuator, the actuator has a mounting stroke between the fully open position away from the valve seat and a second position, which is a position beyond the first position, and wherein the mounting stroke is at least two times the operating stroke.

13. An expansion valve comprising a housing having an inlet port and an outlet port, a valve seat arranged between the inlet port and the outlet port, a valve element movable over an operating stroke between a fully open position away from the valve seat and a first position, which is a closed position at the valve seat, and an actuator having an actuation element connected to the housing, wherein the actuator comprises an electric rotary motor acting on the valve element and the actuation element, wherein in a disassembled condition of the housing and the actuator, the actuator is configured to move the actuation element over a mounting stroke between the fully open position away from the valve seat and a second position, which is a position beyond the first position, and wherein the mounting stroke is at least two times the operating stroke.

* * * * *